US012608561B2

(12) United States Patent
Reinert et al.

(10) Patent No.: US 12,608,561 B2
(45) Date of Patent: Apr. 21, 2026

(54) STRUCTURED DOCUMENT GENERATION USING DOCUMENT-SCALE EMBEDDINGS

(71) Applicant: Capital One Services, LLC, McLean, VA (US)

(72) Inventors: Owen Reinert, Queens, NY (US); Brian Barr, Schenectady, NY (US); Jeremy Goodsitt, Champaign, IL (US); Justin Au-Yeung, Somerville, MA (US)

(73) Assignee: Capital One Services, LLC, McLean, VA (US)

( * ) Notice: Subject to any disclaimer, the term of this patent is extended or adjusted under 35 U.S.C. 154(b) by 245 days.

(21) Appl. No.: 18/441,889

(22) Filed: Feb. 14, 2024

(65) Prior Publication Data

US 2025/0259013 A1 Aug. 14, 2025

(51) Int. Cl.
*G06F 40/40* (2020.01)
*G06F 16/34* (2025.01)
*G06F 40/284* (2020.01)
*G06F 40/30* (2020.01)

(52) U.S. Cl.
CPC ............ *G06F 40/40* (2020.01); *G06F 16/345* (2019.01); *G06F 40/284* (2020.01); *G06F 40/30* (2020.01)

(58) Field of Classification Search
CPC ........ G06F 40/30; G06F 40/40; G06F 40/284; G06F 16/345
See application file for complete search history.

(56) References Cited

U.S. PATENT DOCUMENTS

| | | | |
|---|---|---|---|
| 2018/0196800 A1* | 7/2018 | Volkovs | G06F 40/289 |
| 2020/0184016 A1* | 6/2020 | Roller | G06F 40/30 |
| 2021/0264115 A1* | 8/2021 | Wang | G06F 16/26 |
| 2022/0230465 A1* | 7/2022 | Geng | G06V 30/10 |
| 2023/0112369 A1* | 4/2023 | Chopra | G06N 3/044 |
| | | | 705/304 |
| 2025/0225314 A1* | 7/2025 | Sharpe | G06N 3/045 |
| 2025/0259013 A1* | 8/2025 | Reinert | G06F 16/345 |

* cited by examiner

*Primary Examiner* — Samuel G Neway
(74) *Attorney, Agent, or Firm* — Foley & Lardner LLP

(57) ABSTRACT

A method and related system for generating document embeddings within an embedding space based on a set of structured documents by determining (i) a first vector based on a first segment of a first document and (ii) a second vector based on a second segment of the first document and updating association vectors indicating the second segment based on a distance between the first and second vectors. The method also includes generating a document embedding based on the association vectors, generating a candidate vector based on a candidate document, and determining a result indicating that a second distance between the candidate vector and a first document embedding satisfies a document embedding distance threshold. The method may also include generating a new document by providing, to a text generation model, a portion of the candidate document and a portion of the second segment of the first document.

20 Claims, 3 Drawing Sheets

100

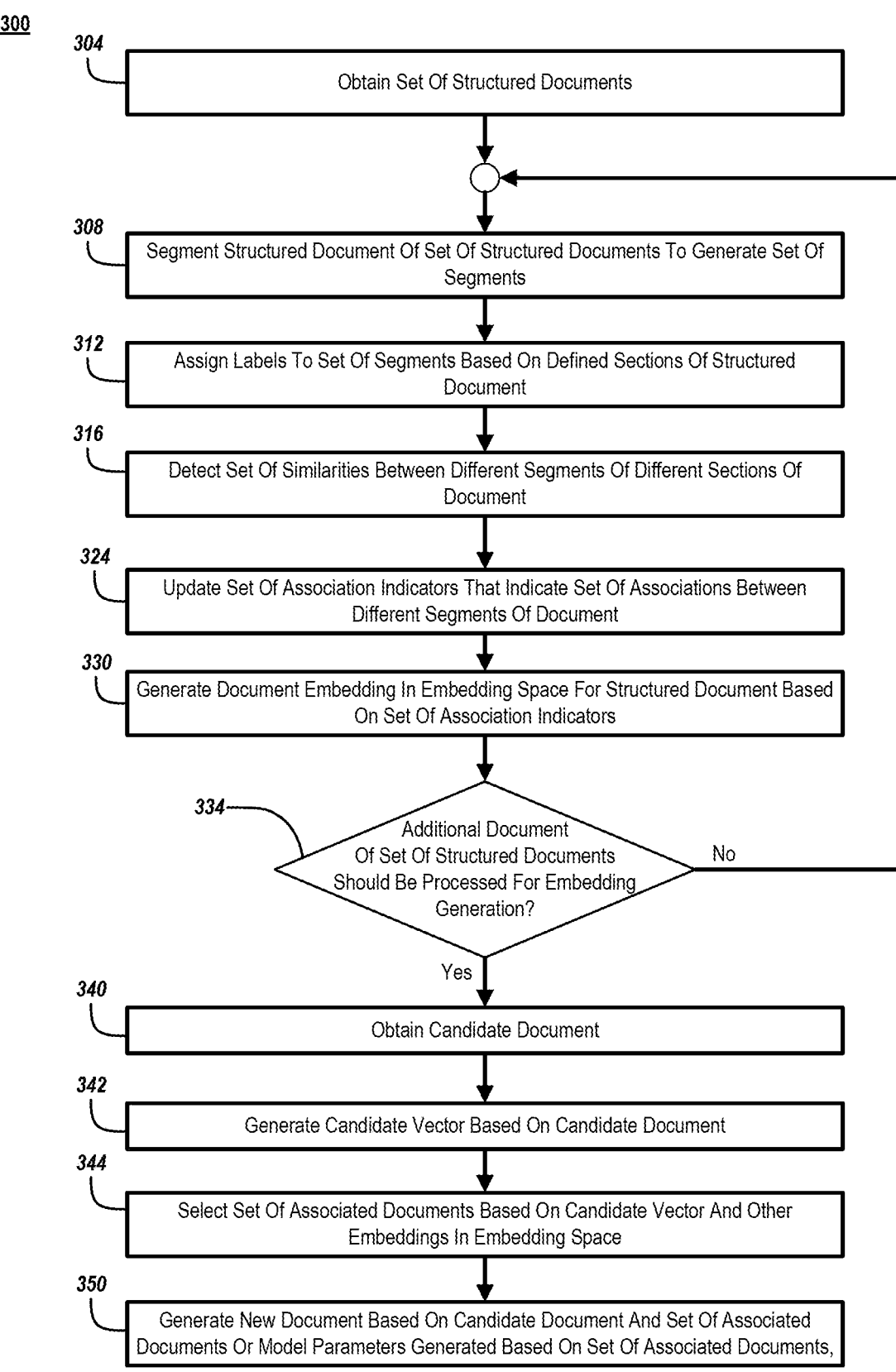

300

304 — Obtain Set Of Structured Documents

308 — Segment Structured Document Of Set Of Structured Documents To Generate Set Of Segments 312 — Assign Labels To Set Of Segments Based On Defined Sections Of Structured Document 316 — Detect Set Of Similarities Between Different Segments Of Different Sections Of Document 324 — Update Set Of Association Indicators That Indicate Set Of Associations Between Different Segments Of Document 330 — Generate Document Embedding In Embedding Space For Structured Document Based On Set Of Association Indicators 334 — Additional Document Of Set Of Structured Documents Should Be Processed For Embedding Generation?

No

Yes

340 — Obtain Candidate Document

342 — Generate Candidate Vector Based On Candidate Document

344 — Select Set Of Associated Documents Based On Candidate Vector And Other Embeddings In Embedding Space 350 — Generate New Document Based On Candidate Document And Set Of Associated Documents Or Model Parameters Generated Based On Set Of Associated Documents,

FIG. 3

STRUCTURED DOCUMENT GENERATION USING DOCUMENT-SCALE EMBEDDINGS

SUMMARY

The growing abilities of generative language models provide exciting prospects across diverse sectors. However, these models often face limitations for specialized purposes due to their inherent inability to focus on special data and their tendency to ignore a significant portion of a training text. Even in cases where a document is structured to explicitly define sections of the document, such structural indications are often insufficient to accurately capture the relationships between text segments in the different sections. The lack of such information may lead to misrepresentations with respect to the relevance of a document for training purposes or other text generation purposes. Furthermore, even if text generation models are trained based on an obtained set of structured documents explicitly indicated to be relevant, such text generation models may be mis-trained due to a significant degree of irrelevant information in the obtained set of structured documents.

Some embodiments may overcome the technical issue described above by using detected relationships between different segments of different sections of structured documents to help determine seed values or text generation models for generating a new document. For example, some embodiments may obtain a set of structured documents and then generate document embeddings within an embedding space based on the set of structured documents. In some embodiments, such embeddings may incorporate information about specific relationships between different segments of different sections. By generating embeddings that incorporate information about associations between different segments of different sections, some embodiments may refine downstream text model training operations to determine a more accurate set of documents for use in training operations. Furthermore, some embodiments may use such embeddings to more accurately select documents for determining one or more seed tokens to pass into a text generation model.

Some embodiments may generate the document embeddings by, for each respective structured document of the structured documents, providing a first segment of the respective structured document to a first encoder model to determine a first vector and a second segment of the respective structured document to the first encoder model to determine a supporter vector, where the first segment is found in a first defined section of the respective structured document, and where the second segment is found in a second defined section of the respective structured document. For each respective structured document, some embodiments may then update a set of association vectors indicating the supporter segment based on a first distance between the first and second vectors and generate a respective embedding of the document embeddings in the embedding space by providing the set of association vectors to a second set of encoder network layers.

After generating the document embeddings, some embodiments may then obtain a candidate document, where the candidate document may be used to generate a new document, such as a new structured document. To do so, some embodiments may generate a candidate vector based on a candidate document. Some embodiments may then determine whether a second distance between the candidate vector and a first document embedding of the document embeddings satisfies a document embedding distance threshold. In response to a determination that the second distance satisfies the document embedding distance threshold, some embodiments may provide, to a text generation model, one or more portions of the candidate document and one or more portions of the supporter segment of the first document to generate the new document.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

FIG. 3 is a flowchart of a process for generating document embeddings in the embedding space, in accordance with one or more embodiments.

Figure 1:
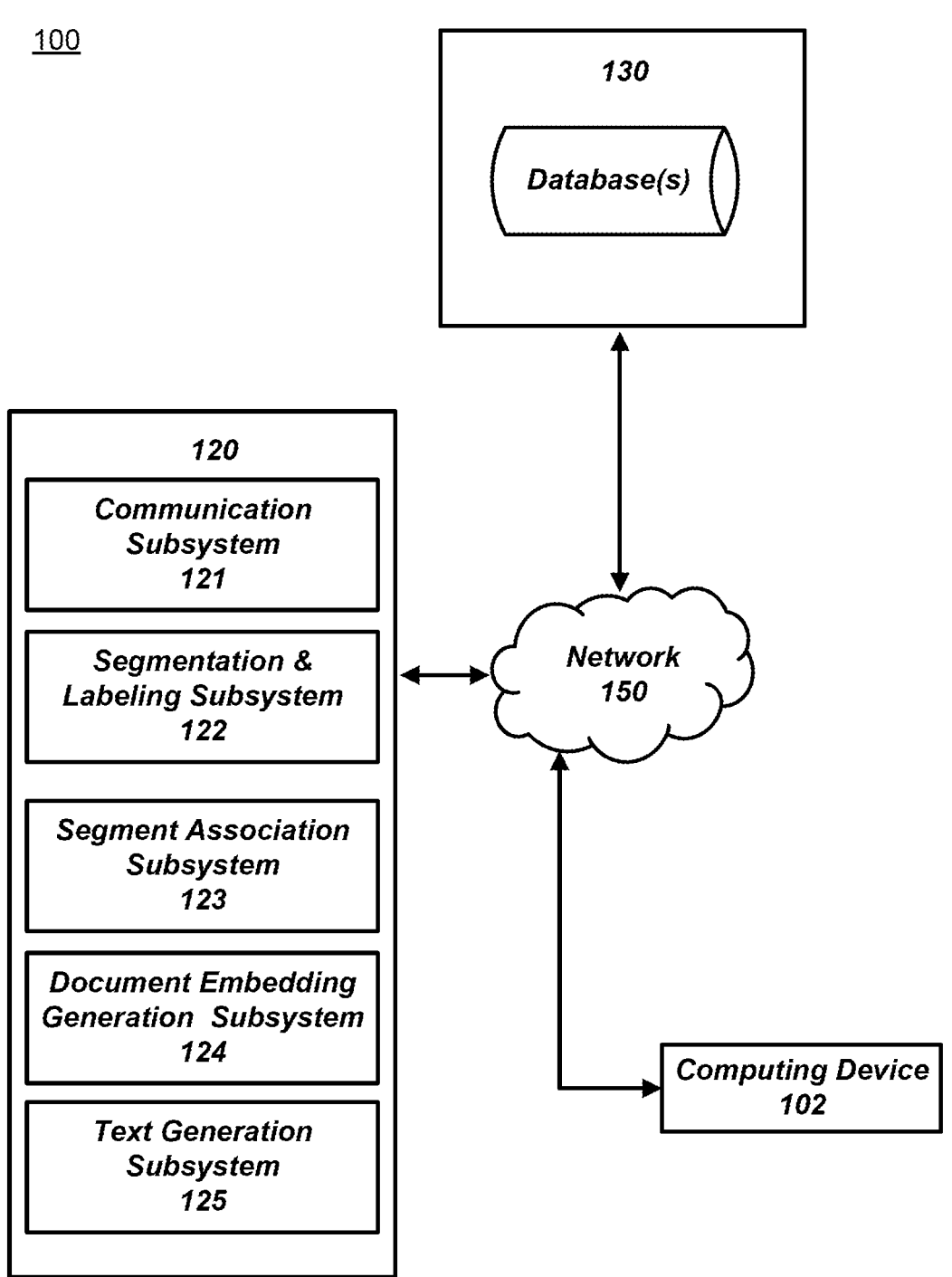
FIG. 1 illustrates a system for generating a structured document based on information associated with document embeddings, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates a system for generating a structured document based on information associated with document embeddings, in accordance with some embodiments. The system 100 includes a computing device 102. The computing device 102 may include computing devices such as a desktop computer, a laptop computer, a wearable headset, a smartwatch, another type of mobile computing device, a transaction device, etc. In some embodiments, the computing device 102 may communicate with various other computing devices via a network 150, where the network 150 may include the internet, a local area network, a peer-to-peer network, etc. The computing device 102 may send and receive messages through the network 150 to communicate with a set of servers 120, where the set of servers 120 may include a set of non-transitory storage media storing program instructions to perform one or more operations of subsystems 121-125.

While one or more operations are described herein as being performed by particular components of the system 100, those operations may be performed by other components of the system 100 in some embodiments. For example, one or more operations described in this disclosure as being performed by the set of servers 120 may instead be performed by the computing device 102. Furthermore, some embodiments may communicate with an application programming interface (API) of a third-party service via the network 150 to perform various operations disclosed herein. For example, some embodiments may generate text via an API by sending input text to the API via the network 150 and receiving, in response to the input text, machine-generated text.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store structured documents, other documents, dates associated with documents, other document metadata, context values, machine learning model parameters, etc.

In some embodiments, a communication subsystem 121 may send data to or receive data from various types of information sources or data-sending devices, including the computing device 102. For example, the communication subsystem 121 may obtain structured documents, dates associated with the documents, other metadata, user-provided candidate documents, or other input data from the various sources of data, such as the computing device 102, the set of databases 130, etc. Furthermore, the communication subsystem 121 may send queries, program instructions, parameters, documents, other text, or other data to the set of databases 130, the computing device 102, etc.

In some embodiments, a segmentation and labeling subsystem 122 may segment and label segments of a structured document obtained via the communication subsystem 121. For example, after obtaining a structured document, some embodiments may chunk the document into a series of segments, where each segment may include one or more tokens. As used in this disclosure, a token may include one or more characters, a number, punctuation or other symbols, a word, a part of a word, etc. In some embodiments, the segmentation and labeling subsystem 122 may generate segments based on punctuation, detected changes in text spacing (e.g., a count or measurement of space satisfies a text spacing threshold), changes in font, indicated changes in metadata, enumeration, bullet points, etc. A segment may include a sequence of tokens and may represent a phrase, a sentence, multiple sentences, a paragraph, multiple paragraphs, the text in a cell of a table, the text in a row of a table, the text in a column of a table, etc.

As used in this disclosure, a structured document may include any document that is organized into different sections. A document section may include multiple characters, words, phrases, sentences, or paragraphs, where a subsection may be a section that is within another section. In some embodiments, a section of a document may be implicitly defined based on document headings, document spacing, changes in formatting, etc., where such sections may be detected using a rule-based section detection method or a machine learning model. Alternatively, or additionally, a document section may be explicitly indicated in metadata associated with the document. A portion of a structured document may include sections of the document, headings of the document, paragraphs of the document, standards of the document, phrases of the document, lists of the document, some combination of the above, etc. A portion may be within another portion, where a portion that is within another portion may be referred to as a "sub-portion," where it should be understood that a portion that is not referred to as a sub-portion can still be a sub-portion.

In some embodiments, the segmentation and labeling subsystem 122 may label segments based on their sections. For example, a segment within a first section of a structured document may be labeled "support" based on a determination that the first section has a header with the text "SUPPORT." In some embodiments, the labels assigned to different segments may be used to indicate relationships between segments associated with different sections. For example, based on a determination that a first segment is labeled "LEADER" and that a second segment is labeled "SUPPORT," some embodiments may perform operations to detect similarities or other types of associations between the first and second segments. By taking advantage of the arrangement of a structured document into different sections, some embodiments may increase the accuracy of text relevance and text generation operations. Furthermore, segments or documents may be labeled based on one or more document metadata values associated with the document. Additionally, some embodiments can reduce the minimum size for the context window for a language model by breaking the document into separately encoded sections. A model with a smaller context window can often be much faster and less costly to operate.

In some embodiments, a segment association subsystem 123 may associate different segments with each other based on detected similarities between the different segments. In some embodiments, the segment association subsystem 123 may use the labels assigned to different segments to more efficiently determine relationships. For example, some embodiments may detect similarities between segments based on segment-level embeddings associated with the different segments. When determining segment-level embeddings, some embodiments may use a set of encoder network layers of an encoder neural network to generate an embedding. It should be understood that, unless otherwise state, the term "embedding" and "embedding vector" may be used interchangeably in this disclosure. Some embodiments may provide a segment to the set of encoder network layers to determine a segment-level embedding associated with the provided segment. As described elsewhere in this disclosure, some embodiments may categorize segments as leader segments or supporter segments, where a supporter segment may map to a leader segment to indicate that the supporter segment includes descriptive information pertinent to the leader segment. Under this nomenclature framework, some embodiments may provide a leader segment to a set of encoder network layers to determine a leader vector, where the leader vector is an embedding representing the leader segment. Similarly, some embodiments may provide a supporter segment to the set of encoder network layers to determine a supporter vector. Some embodiments may perform, for some or all of the segments of a structured document, similar operations or the same operations to determine embeddings associated with some or all of the segments.

Some embodiments may determine distances between embeddings in an embedding space and use the distances to determine whether vectors and their corresponding segments should be associated with each other. For example, some embodiments may generate a leader vector that is associated with a leader segment by providing the leader segment to a set of encoder network layers and generate a supporter vector that is associated with a supporter segment by providing a supporter segment to the set of encoder network layers. Some embodiments may then determine that the leader vector and the supporter vector are associated based on a determination that the distance between the leader and supporter vectors is within a first distance threshold. Alternatively, or additionally, some embodiments may have one or more pre-determined clusters and, based on a determination that both the leader vector and the supporter vector are part of the same cluster, determine that the leader and supporter vectors are associated with each other.

Some embodiments may update a set of association vectors based on detected similarities between the different segments as indicated by distances in a segment-level embedding space. For example, the segment association subsystem 123 may modify or generate a set of association vectors (e.g., vectors representing a sparse matrix or other data structure) indicating detected associations based on similarities between different segments. Based on a determination that a supporter vector and a leader vector are associated with each other, some embodiments may update a set of elements of a set of association vectors to indicate the indices of the supporter segment and the leader segment. As described elsewhere in this disclosure, this set of association vectors may be used as inputs for another machine learning model. The inclusion of such information may allow the machine learning model to efficiently capture relationships between different segments for use in an embedding space that better captures similarities between different segments.

Instead of detecting similarities between all segments in a document with respect to each other, some embodiments may restrict operations for detecting similarities to segments assigned to different sections or even specific sections. For example, some embodiments may be configured to detect similarities only between a leader segment and one or more supporter segments. Alternatively, some embodiments may be configured to detect similarities between segments of other sections.

In some embodiments, a document embedding generation subsystem 124 may generate document embeddings associated with the documents used to generate the document embeddings. In some embodiments, for each respective document of a set of structured documents obtained for populating an embedding space, the document embedding generation subsystem 124 may generate a respective embedding associated with the respective document. Some embodiments may generate a document embedding for a structured document based on the contents of the structured document and the set of association vectors indicating the similar segments of the structured document. Some embodiments may use a set of encoder network layers of an encoder model to generate document embeddings, where the document embedding generation subsystem 124 may provide some or all of the structured document to a set of encoder network layers to generate a document embedding. Some embodiments may use the relationships identified in the set of association vectors to draw attention to particular segments of a structured document. The attention may be represented as attention weights stored in a vector representing an additional set of weights used to emphasize the importance of certain segments of a structured document.

In some embodiments, a text generation subsystem 125 may generate text based on an obtained candidate document, where the candidate document may be obtained via the communication subsystem 121. In some embodiments, the candidate document may be significantly shorter than one or more structured documents. Furthermore, the candidate document may be unstructured, where an unstructured document does not explicitly include text indicators that divide different portions of the unstructured document into sections. Some embodiments may use the same encoder model used to generate embeddings of structured documents to also generate a candidate vector based on the candidate document. Alternatively, some embodiments may use a different encoder model and provide this different encoder model with the candidate document to generate a candidate vector. In some embodiments, the text generation subsystem 125 may generate a candidate vector that is in the same embedding space as the embedding space populated with other document embeddings, where the other document embeddings are generated with the use of the document embedding generation subsystem 124.

Some embodiments may then determine distances between the candidate vector and the other embeddings of the embedding space. Some embodiments may use these determined distances to select at least one other document embedding based on a determination that one or more sets of criteria are satisfied. For example, some embodiments may select another document embedding based on a determination that this other document embedding is the nearest neighbor to the candidate vector in the embedding space. Alternatively, or additionally, some embodiments may select another document embedding based on a determination that this other document embedding is within a threshold distance of the candidate vector in the embedding space. Alternatively, or additionally, some embodiments may select another document embedding based on a determination that this other document embedding is in the same cluster as the candidate vector.

Some embodiments may determine that a candidate vector or other vector is within a cluster of document embeddings by generating a multidimensional hull based on the document embeddings of the cluster. Some embodiments may generate a hull by an implementation of a convex hull algorithm, such as an implementation of a Jarvis march algorithm, an implementation of a Quickhull algorithm, or an implementation of a Chan's algorithm. Some embodiments may then determine that a candidate vector is associated with a document embedding based on a determination that the candidate vector is within the generated hull.

Some embodiments may identify the set of documents that is associated with a selected set of document embeddings indicated to be associated with a candidate vector. For example, in response to a determination that a distance between the first document embedding and the candidate vector satisfies a document embedding distance threshold, some embodiments may perform operations to generate a new document. Such operations may include retrieving a first document associated with a first document embedding and providing text from the first document to a text generation model to generate a new document. For example, some embodiments may select a first set of seed tokens from a candidate document provided by the user and may further select a second set of seed tokens from the retrieved first document, where the second set of seed tokens is retrieved from portions of the retrieved first document within a document section labeled "support." Some embodiments may then generate a new document based on an output of the text generation model, where the new document may further be a structured document.

Figure 2:
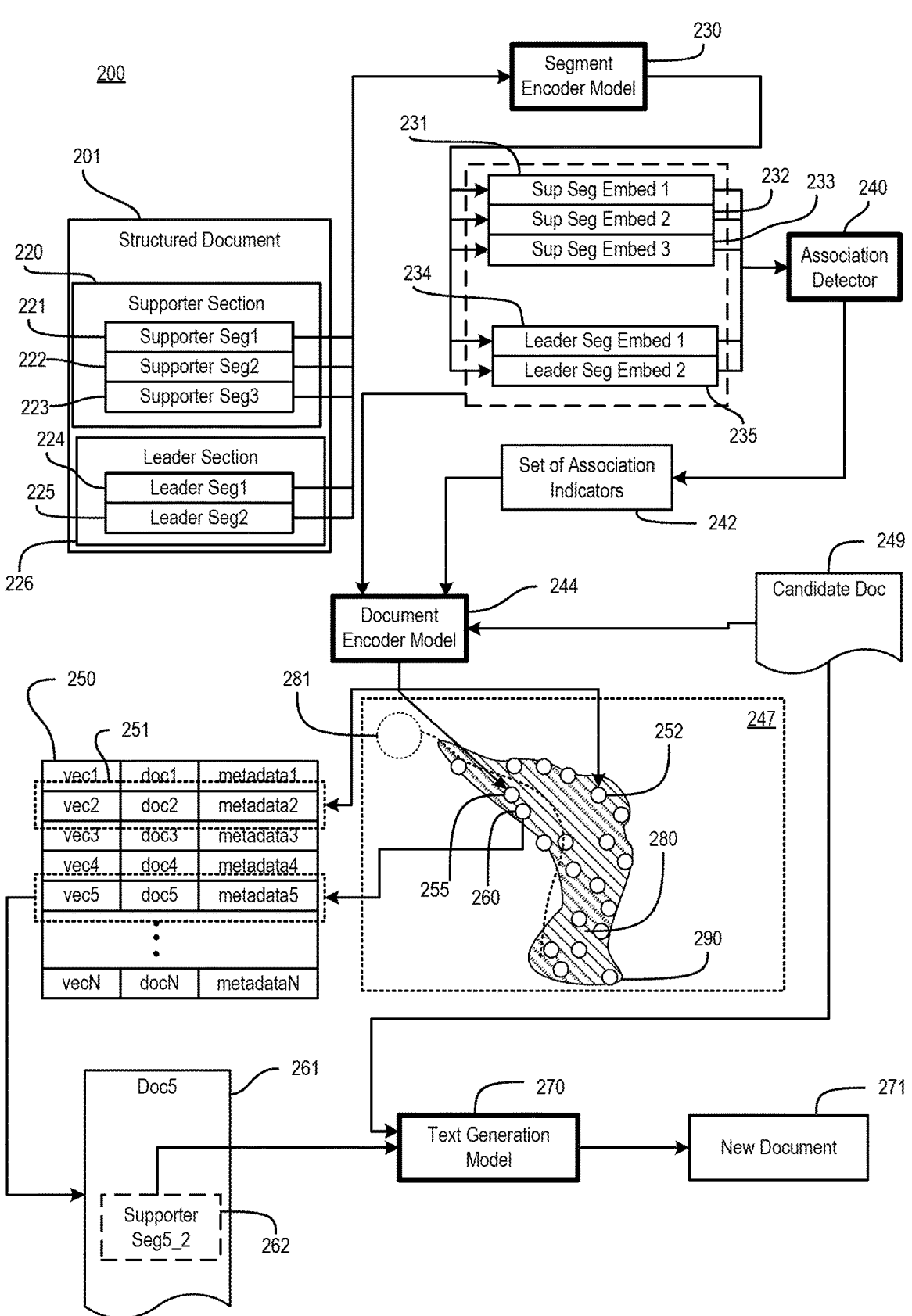
FIG. 2 illustrates a conceptual diagram of a system for generating embeddings in an embedding space for use in document generation, in accordance with some embodiments.

FIG. 2 illustrates a conceptual diagram of a system for generating embeddings in an embedding space for use in document generation, in accordance with some embodiments. Some embodiments may obtain a structured document 201, where the structured document 201 may include a first section 220 and a second section 226, where the first section may be identified with a first header, and where the second section may be identified with a second header. While this disclosure may refer to sections as parts of a leader or supporter section, it should be understood that these names may be changed and that sections having different names may be a leader section or a supporter section. For example, some embodiments may assign, as leader segments, all segments of a first section of a structured document labeled "claims" and may assign, as supporter segments, all segments of a second section of a structured document labeled "specifications."

Some embodiments may chunk the first section 220 into a set of segments that includes a first supporter segment 221, a second supporter segment 222, and a third supporter segment 223, where the segments may be determined based on spacing and punctuation (e.g., separating a section by using commas, periods, semicolons, or other punctuation as delimiters). Similarly, some embodiments may chunk the second section 226 into a first leader segment 224 and a second leader segment 225. When separating the second section 226 into different segments, some embodiments may use the same rules used to separate the first section 220 into different segments. Alternatively, some embodiments may use different rules to separate the second section 226 into different segments. For example, some embodiments may separate the first section 220 into the supporter segments 221-223 such that each supporter segment is a sentence (e.g., by using periods and spacing as delimiters). Some embodiments may then separate the second section 226 into the leader segments 224-225 (e.g., by using colons and semicolons as delimiters). Some embodiments may provide each of the segments 221-225 to a segment encoder model 230. The segment encoder model 230 may generate a first supporter segment embedding 231 based on the first supporter segment 221, generate a second supporter segment embedding 232 based on the second supporter segment 222, and generate a third supporter segment embedding 233 based on the third supporter segment 223. Similarly, the segment encoder model 230 may generate a first leader segment embedding 234 based on the first leader segment 224 and generate a second leader segment embedding 235 based on the second leader segment 225.

Some embodiments may provide the embeddings 231-235 and other embeddings generated based on segments of the structured document 201 to an association detector 240. In some embodiments, the association detector 240 may detect associations between the first set of embeddings 231-233 and the second set of embeddings 234-235, where relationships between these two sets of embeddings may be emphasized based on a determination that the segments used to generate the first set of embeddings 231-233 are all obtained from the first section 220 and that the segments used to generate the second set of embeddings 234-235 are all obtained from the second section 226. Some embodiments may detect similarities between embeddings of different sections based on a determination that a distance between the two embeddings in an embedding space satisfies an embedding space distance threshold. For example, some embodiments may determine that the first supporter segment embedding 231 and the first leader segment embedding 234 are related based on a determination that a distance between the first supporter segment embedding 231 and the first leader segment embedding 234 satisfies a distance threshold. The association detector 240 may then generate a set of association indicators 242, where the set of association indicators 242 may indicate relationships between the segments of the first section 220 and the segments of the second section 226.

Some embodiments may provide a document encoder model 244 with the set of association indicators 242 and at least one of the segments 221-225 or the embeddings 231-235. The document encoder model 244 may use this data to then generate an embedding vector for the structured document 201 as represented by the entry "vec2" in a row 251 of a dataset 250. Furthermore, some embodiments may perform similar operations for other structured documents to generate the set of document embeddings surrounded by a cluster-defined hull 290 within an embedding space 247.

Some embodiments may then obtain input text for use in generating a new document, where the input text may be a candidate document 249. Some embodiments may then provide the candidate document 249 to the document encoder model 244 to generate a candidate vector 255. Some embodiments may then determine a set of distances between the candidate vector 255 and other embeddings within the cluster-defined hull 290. Based on this determined set of distances, some embodiments may select a document embedding 260 based on a determination that the document embedding 260 is nearest to the candidate vector 255. Some embodiments may then retrieve a first document 261 that is titled "doc5" based on an association between the identifier "doc5" and the document embedding 260, where the association is indicated in a dataset row of the dataset 250.

Some embodiments may provide one or more seed tokens of the first document 261 and one or more seed tokens of the candidate document 249 to a text generation model 270. The text generation model 270 may then generate a new document 271 based on the first and second sets of seed tokens. Some embodiments may select a specific portion of the first document 261 from which to obtain seed tokens. For example, some embodiments may select a segment 262 of the first document 261 based on a determination that the segment 262 is labeled as being of the same type of section as the first section 220.

In some embodiments, the embeddings within the cluster-defined hull 290 may be provided in association with a set of time values, such as dates. Some embodiments may use this information to generate a time-based function 280 representing a prediction model for future embedding vectors. Some embodiments may then use the time-based function 280 to predict that a future embedding will be within a predicted region 281. Some embodiments may then determine whether to modify the candidate vector 255 or determine a different set of seed tokens based on the predicted region 281 (e.g., generate a set of seed values to generate a new document that will be within the predicted region 281).

It should be understood that while the system 200 shows the use of a single generative language model in the form of the text generation model 270, other embodiments may use multiple generative language models. Alternatively, or additionally, some embodiments may use a generative language model that may be split into multiple sub-models, such as a first sub-model that uses a transformer-based model and a second sub-model that uses a random forest model. Furthermore, a generative language model used in this disclosure may be split into multiple processing layers, where different processing layers may process the data in different ways (e.g., a first layer that uses the output of the set of neural network layers).

FIG. 3 is a flowchart of a process 300 for generating document embeddings in the embedding space, in accordance with one or more embodiments. Some embodiments may obtain a set of structured documents, as indicated by block 304. Some embodiments may access a local database of documents to obtain a corpora of structured documents for vector generation. Alternatively, or additionally, some embodiments may obtain one or more structured documents for vector generation from a third-party data source. Furthermore, some embodiments may construct one or more structured documents for use in the corpora of structured documents.

Some embodiments may segment a structured document of the set of structured documents to generate a set of segments, as indicated by block 308. Some embodiments may segment a structured document into multiple segments, where each segment may be associated with a label specific to a section of the structured document. For example, if a first document section is labeled "DESCRIPTIVE SEC-TION," some embodiments may split the first document section into multiple segments, where each segment is labeled "DESCRIPTIVE SECTION." Furthermore, a seg-ment of a document may be assigned one or more labels that are not included in the document. For example, some embodiments may assign the label "leader segment" to a document even if the phrase "leader segment" is not found in the document. Furthermore, when segmenting a docu-ment, some embodiments may segment a document with non-overlapping segments. Alternatively, some embodi-ments may segment the document with overlapping seg-ments.

Some embodiments may segment the document based on a set of detected matches between tokens in a document and tokens obtained from a list of tokens or token sequences. For example, some embodiments may obtain a list of target tokens and token sequences indicating the start of a new segment, where the list includes the sequence "A system can." Some embodiments may then detect a set of matches that includes a match with the phrase "A system can expand circumferentially" and define a following phrase, sentence, or paragraph or other sequence of tokens as a segment to be labeled, used for vector generation, or used in other opera-tions described in this disclosure.

Some embodiments may assign labels to the set of seg-ments based on defined sections of the structured document, as indicated by block 312. Some embodiments may assign labels to segments that divide the segments into leader segments and supporting segments, where a leader segment may be linked to a supporting segment with respect to a shared set of terminology, a shared set of phrases, or a shared set of references to other portions of the structured docu-ment. In some embodiments, font differences, spacing (e.g., satisfying a text spacing threshold), or other difference may indicate different sections. Alternatively, a structured docu-ment may include metadata tags that explicitly define por-tions of the structured document. For example, a structured document may be saved in an XML format, where a first metadata tag for a first section is labeled "leader," and where a second metadata tag for a second section is labeled "support."

Some embodiments may detect a set of similarities between different segments of different sections of the document, as indicated by block 316. Some embodiments may perform operations to detect similarity relationships between supporter segments and leader segments, where an indication of such a similarity relationship may be useful to improve the quality of a generated structured document in the future. Some embodiments may use domain-specific knowledge stored in a dictionary, list, key-value pairs, or another type of data structure to determine whether a docu-ment segment that is determined to be within a document section should be assigned a leader label, a supporter label, or another label. For example, some embodiments may determine that a document segment is within a document section having a text header "DETAILED DESCRIP-TORS." Some embodiments may access a list of key-value pairs that indicates that the phrase "DETAILED DESCRIP-TORS" is mapped to the label "FOLLOWER," and, in response to determining this mapping, may label the docu-ment segment with the label "FOLLOWER."

As described elsewhere in this disclosure, even if a document structure of a structured document explicitly defines portions of the document into leader segments and supporter segments, the similarity relationships between a particular leader segment and a particular supporter segment may be poorly defined or undefined. Some embodiments may use an initial relationship-mapping operation to deter-mine associations between a leader segment and one or more supporter segments. In some embodiments, the relationship-mapping operation may be based on a shared vocabulary. For example, some embodiments may detect that a leader segment includes the phrase "phrase-word1, phrase-word2 and phrase-word3" and that a candidate supporter segment includes the same phrase. Based on this phrase match, some embodiments may associate the leader segment with the candidate supporter segment.

In some cases, shared terminology or phrasing may be insufficient to detect matches between leader portions and supporter portions. For example, a leader segment that uses a set of vocabulary words that are commonly used in a document may be over-mapped to multiple supporter seg-ments, rendering such mapping as ineffective for training purposes. Moreover, relying solely on shared phrases and vocabulary may overlook semantic similarities in phrases. To overcome this problem, some embodiments may use segment-level encodings to determine the semantic similari-ties of different text segments and determine associations between the text segments.

Some embodiments may use distances in embedding space to determine semantic similarities. Some embodi-ments may use a distance in an embedding space to perform direct measurements and determine outcomes based on those direct embedding space distances. Alternatively, or additionally, some embodiments may use a set of distances in an embedding space to determine clusters or some other aggregation of vectors based on distances between vectors. For example, some embodiments may generate a segment embedding by providing an encoder model having a set of encoder neural networks with a first segment that is selected from a set of leader segments, where the encoder model may provide an output vector to be used as a first leader segment vector in a segment-level embedding space. Some embodi-ments may perform similar actions for each leader segment in a collection of leader segments to obtain a plurality of leader segment vectors. Some embodiments may provide the same encoder model or a different encoder model with a second segment that is selected from a set of supporter segments and obtain a second output vector to be used as a first supporter segment vector in the segment-level embedding space. Some embodiments may perform similar actions for each supporter segment in a collection of supporter segments to obtain a plurality of supporter segment vectors.

For one or more pairs of leader segments and supporter segments, some embodiments may then determine associations between leader and supporter segments based on the distance in the segment-level embedding space between their corresponding segment vectors. For example, some embodiments may then determine a distance between the first leader segment vector and the first supporter segment vector in the segment-level embedding space, where the distance may include a Euclidean distance, a Manhattan distance, or some other type of distance. Some embodiments may then determine that the leader and supporter segments are related based on a determination that the distance between the leader and supporter segment vectors is equal to or less than a segment-level distance threshold. For example, some embodiments may determine a distance between a first vector of a segment labeled with the label "claims" and a second vector of a segment labeled with the label "specifications." Some embodiments may then determine that the distance is less than or equal to a segment-level distance threshold and thus that the first vector is associated with the second vector. In some embodiments, the segment-level distance threshold may be a default value that is normalized with respect to a range of the embedding space. Furthermore, some embodiments may determine a segment-level threshold against which a distance between two embeddings is compared based on a domain label or other type of label associated with the document containing the first and second segments used to generate the two embeddings.

Some embodiments may use a knowledge graph or other entity recognition model to expand the vocabulary of an indicated portion and generate additional vectors. For example, in some embodiments, a knowledge graph may indicate relationships between different tokens or phrases. Some embodiments may obtain a first set of segments that can represent leader segments and a second set of segments that can represent supporter segments. Some embodiments may then generate a plurality of phrases based on one or more supporter segments by substituting initial tokens of the one or more supporter segments with additional tokens mapped to the initial tokens by the knowledge graph. As described elsewhere, some embodiments may then generate a plurality of intermediate embeddings based on the modified segments and then use the intermediate embeddings to generate a plurality of document embeddings.

Some embodiments may update a set of association indicators that indicate the set of associations between different segments of a document, as indicated by block 324. In some embodiments, the set of association indicators indicating the set of associations may be represented as a set of vectors that draw attention to or otherwise emphasize relations between different portions of a document ("association vector"). Some embodiments may generate multiple association vectors, where each association vector may correspond with a different leader segment indicating a number of supporter segments associated with the different leader segment. For example, if a leader segment is determined to be associated with a set of supporter segments represented by segment indices "[001]," "[006]," and "[051]," some embodiments may generate a set of vectors in a compressed sparse row (CSR) form indicating the indices of these supporter segments. It should be understood that the indices for segments may be represented in other forms or that the format used to store these indices may be in other forms (e.g., compressed sparse column (CSC), coordinate list (COO), list of lists (LIL), etc.).

Some embodiments may generate a document embedding for the structured document based on the set of association indicators, as indicated by block 330. Some embodiments may generate embedding vectors for documents by generating one embedding vector for each document using a method that accounts for a set of association vectors. For example, some embodiments may pass in both a document and a set of association indicators that indicates relationships between different segments of the document. For example, some embodiments may first chunk a document into multiple segments using operations described in this disclosure, such as segmentation operations described for block 304, where each of the segments may be assigned a section indicator and an index identifier. Some embodiments may then determine a set of associations between different segments based on similarities between the different segments, using operations described for block 312. Some embodiments may then provide both the segmented document and the set of associations to a machine learning encoder model to generate a document embedding to represent the document.

Various mechanisms can be used by a machine learning encoder model designed to generate document embeddings. Some embodiments may use previously generated embeddings representing smaller portions of a document to generate a document-scale embedding of the document. For example, some embodiments may have previously generated a set of segment embeddings that represent different segments of a document in order to determine similarities between the segments. Such similarities may then be used to generate a set of association vectors or another type of data structure to represent associations between different segments. Some embodiments may then use the same segment embeddings as inputs for the generation of a document embedding. Furthermore, some embodiments may use these other indicators corresponding with a structured document to determine how to further process segment embeddings. For example, some embodiments may have three different segments of a document that are labeled "support" and that are all associated with a fourth segment that is labeled "leader." Some embodiments may then determine an average (or other measure of central tendency) based on these three different segments and provide this measure of central tendency as an input to a machine learning model in association with the fourth segment to determine a document embedding. Alternatively, or additionally, some embodiments may concatenate these three different segments and provide them to the machine learning model in association with the fourth segment to determine the document embedding.

As described elsewhere, some embodiments may use the set of association indicators as inputs for a hierarchical attention model, where the set of association indicators may be used as or used to determine a set of attention vectors when determining document-scale embeddings. For example, a machine learning model may include one or more attention layers to assign an attention score for each determined segment of a document. Some embodiments may then assign scores to each segment using the one or more attention layers, where the assignment of scores may include operations based on one or more values of the set of association indicators. Additionally, or alternatively, some embodiments may assign scores to each segment using the one or more attention layers based in part on other categories or labels associated with a segment. For example, some embodiments may assign greater weights to segments of a document indicated as being "leader" segments and segments of the document indicated as being associated with "leader" segments. The association between a candidate portion of a document and a "leader" segment of the document may indicate that the candidate portion of an otherwise voluminous document should be considered for training purposes in view of other portions of the document.

Some embodiments may detect similarities between image data and one or more segments of a structured document. Some embodiments may perform object recognition operations using an object recognition model to detect one or more symbols, characters, words, phrases, sentences, or other set of tokens in the image text of an image. Some embodiments may then use this detected data to determine an association with a target segment of a structured document. For example, some embodiments may provide an object recognition model with a set of images including image text to detect the phrase "articulating member." Some embodiments may then detect the same phrase in a leader segment and associate the phrase with the leader segment. Some embodiments may then indicate this association in a set of association indicators used to generate a document embedding.

Some embodiments may generate multiple sets of document vectors for a document based on different combinations of document segments. For example, some embodiments may associate different "leader" segments based on shared words or phrases or based on a distance in a segment-level embedding space being less than or equal to a threshold. Some embodiments may then group these "leader" segments and their associated "support" segments together when generating a document-scale embedding. For example, some embodiments may determine that a first segment embedding and a second segment embedding are similar based on a threshold and further that a third segment embedding and a fourth segment embedding are similar based on the threshold, where the first, second, third, and fourth segments are all labeled "leader." Some embodiments may then determine a first document embedding by using an attention-based machine learning model based on a set of attention vectors. The set of attention vectors may focus a model's attention on a first segment and a second segment of a document and a corresponding set of segments labeled "support" which are indicated to be associated with the first and second segments of the document. Some embodiments may then determine a second document embedding for the same document with a vector that increases in attention on third and fourth "leader" segments of the document and another set of "support" document segments indicated to be associated with the third and fourth "leader" segments.

As described elsewhere, some embodiments may train multiple generative models or multiple portions of a generative model corresponding with different sets of documents, where each respective model or respective portion of a model may be selected based on positions in a document embedding space. For example, some embodiments may train a first set of text generation model neural network layers based on a first set of structured documents and train a second set of text generation model neural network layers based on a second set of structured documents. In some embodiments, the documents of the first set of structured documents are selected based on a determination that they are in a first cluster of document vectors of a document-level embedding space, and the documents of the second set of documents are selected based on a determination that they are in a second cluster of document vectors of the document-level embedding space. Alternatively, or additionally, the documents of the first set of structured documents are selected based on a determination that they are associated with a category indicating a first document type, and the documents of the second set of documents are selected based on a determination that they are associated with a second category indicating a second document type.

In the context of selecting documents for training a text generation model or otherwise selecting documents as training inputs for a machine learning model, similarities in category or embedding space distances between document vectors may represent similarities in a prioritized type of document segment. For example, some embodiments may select a set of documents based on shared similarities between the corresponding leader segments of the set of documents. Alternatively, or additionally, some embodiments may determine similarities in leader segments based on distances in an embedding space or clusters determined from determining distances in the embedding space. Furthermore, during a training operation for a text generation model, some embodiments may select specific portions indicated by a set of association indicators to provide training inputs. For example, after selecting a subset of documents based on their document embeddings for training operations, some embodiments may extract the text portions from first and second sections of the subset of documents in association with each other to a text generation model for training operations.

As described elsewhere, some embodiments may use a knowledge graph to determine a plurality of phrases by selecting a set of additional tokens for use based on a determination that the set of additional tokens are mapped to a set of initial tokens of a set of segments. Some embodiments may then generate a plurality of modified segments by replacing the initial tokens of the set of segments with the additional tokens. Some embodiments may then generate a plurality of intermediate embeddings based on the plurality of modified segments by providing each respective modified segment to a first set of encoder layers representing a segment-level encoder model or a part of the segment-level encoder model. For each different embedding of the plurality of intermediate embeddings, some embodiments may then generate a different document vector using operations described in this disclosure.

Some embodiments may track the date information associated with documents to generate a prediction model for embedding vectors in a document embedding space. For example, some embodiments may obtain dates (e.g., in the form of timestamps) associated with a set of structured documents, wherein each date of the dates is mapped to a document of the set of structured documents. The dates may represent various types of information related to the documents, such as a document creation time, document modification time, document generation time, or the like. Some embodiments may then use the time information to predict a future position in a document embedding space using a trajectory based on the dates. Some embodiments may perform regression operations and use the resulting regression model for prediction operations. For example, if an embedding space has 50 dimensions, some embodiments may use a multidimensional regression operation to determine a trajectory over time along each of the 50 dimensions. Alternatively, or additionally, some embodiments may use a multivariate time series model, such as a vector autoregression model, when predicting trends over time. Additionally, or alternatively, some embodiments may use a probabilistic regression model, such as a Bayesian regression or Gaussian process, to predict a future value. For example, some embodiments may provide a Bayesian model with an initial multivariate regression function in the embedding space for use as an initial model, where time is a variable of the function. Some embodiments may then assign distributions to each of the constants of the regression function and then compute posterior distributions for the constants.

Some embodiments may train or use a machine learning model, such as a random forest, gradient boosted machines, or neural network to predict a future embedding space position. For example, some embodiments may train a transfer-based neural network to predict a set of future values by providing the transfer-based neural network with historical embeddings associated with documents and the corresponding publication times of those documents. Furthermore, as described elsewhere, some embodiments may predict a subset of values without being required to predict all the values of a future vector in an embedding space. For example, an application executing on a computing device may store, in a first subset of values of a document embedding, numeric data related to the semantic meaning of a first section of a structured document, where the first section may include one or more leader segments of the structured document. The application may also store, in a second subset of values of the document embedding, numeric data related to a second section of the structured document. The application may also store, in a third subset of values of the document embedding, numeric data related to inter-section associations between the first section and the second section of the structured document. Some embodiments may generate a polynomial model or other model to represent the trajectory of document embeddings based on the first subset of values and other values in the same dimension as the first subset of values, where the other values are values of other document embeddings in the embedding space. In some embodiments, the generated polynomial model or other model may ignore values not in the same dimension as the first subset of values, such as the second subset of values or the third subset of values.

When predicting a future value, some embodiments may predict future values based on a selected set of embeddings in an embedding space. In some embodiments, an embedding space may include a plurality of embeddings, where different subsets of embeddings may be associated with different labels. For example, a first subset of documents may be associated with the label "owner1" indicating an owner identified by the first label, and a second subset of documents may be associated with the second label "owner2" indicating a second owner identified by the second label. Some embodiments may then predict a future embedding vector that will be associated with the label "owner1" based on the first subset of embedding vectors and their associated time values. In some embodiments, predicting a future embedding vector may include predicting a future region within which the future embedding vector is likely to be found. After predicting the future vector or future region within which the vector may be found, some embodiments may store this information in association with the label.

Some embodiments may include one or more values in generated vectors based on the metadata of documents. Such metadata may indicate an owner of a document, a country identifier associated with the document, a document creator identifier, a document storage, an organization to which the document is assigned, a view count of the document, or another value associated with the document. When generating a document embedding, some embodiments may provide metadata values to an encoder neural network model or other encoder model, where the metadata values indicate an owner of the document, a document creator identifier (e.g., a name of an author, composer, or inventor), or a country identifier associated with the document. The inclusion of document metadata into an embedding space may help provide additional context for a document that may otherwise be ignored because such information would not be captured in the body of the document itself.

Some embodiments may determine whether an additional document of the set of structured documents should be processed for embedding generation, as indicated by block 334. Some embodiments may determine that each document of an obtained set of documents should be processed to populate an embedding space. Alternatively, some embodiments may determine that a computing resource utilization threshold has been satisfied and stop further embedding vector generation operations. Based on a determination that an additional document of the set of structured documents should be processed for embedding generation, some embodiments may select a structured document for which an embedding vector has not yet been generated and perform operations described for block 304. Otherwise, operations of the process 300 may proceed to block 340.

Some embodiments may obtain a candidate document, as indicate by block 340. Some embodiments may obtain a candidate document via a direct entry of the candidate document in a user interface. Alternatively, or additionally, some embodiments may obtain a candidate document from a source address that is provided by a user via the user interface. Furthermore, some embodiments may obtain a candidate document from an API, an automated script, an internal database, or some other source. Alternatively, some embodiments may select a portion of a document from the set of structured documents obtained in operations described for block 304 and use this portion as a candidate document.

Some embodiments may generate a candidate vector based on the candidate document, as indicated by block 342. Some embodiments may provide a candidate document to a document-scale embedding model, where the document-scale embedding model may be similar to or the same as the one generated using one or more operations described for block 320. For example, some embodiments may split the candidate document into a set of segments, label the segments based on indicated sections of the candidate structured document, and determine different segment-level embeddings based on the segments. Splitting the candidate document into segments may include splitting a candidate document based on punctuation (e.g., each sentence is its own segment, each clause separated by a colon or semicolon is its own segment, each element of an enumerated list is its own segment, etc.). Some embodiments may then determine associations between the different segments of different sections based on the segments and generate a candidate embedding vector based on the set of segment-level embeddings and the indicated sections.

Some embodiments may refer to a knowledge graph to replace certain words or phrases or to expand the definition of certain words or phrases when generating new text. To prompt alternative phrasing, some embodiments may perform co-reference resolution operations or entity linking operations for an input text (e.g., the candidate document). For example, some embodiments may access a knowledge graph and determine one or more alternative words or phrases associated with input words or phrases. For example, some embodiments may obtain a document that includes a first token "surrounding" and access a knowledge graph that indicates the first token "surrounding" is associated with a first alternative token "encompassing" and a second alternative token "covering." Some embodiments may then replace the first token with one or more alternative tokens to generate a modified version of the candidate document. After generating the modified version of the document, some embodiments may then use the modified version to generate a candidate vector or as an input for a text generation model.

Some embodiments can generate multiple candidate vectors by generating different versions of input text and then using the different summarizations as inputs. For example, some embodiments may provide a candidate document or a portion of a candidate document to a text summarization model to generate a plurality of summarizations. The text summarization model may include one of various types of text summarization models, such as an extractive summarization model or an abstractive summarization model. Some embodiments may then, for each respective summarization, generate a different document embedding by providing the respective summarization to an encoder model, such as an encoder model described in this disclosure. Some embodiments may then perform operations described in this disclosure to generate a new document based on the different document embeddings and their corresponding summarizations. For example, some embodiments may generate a plurality of candidate vectors by, for each respective summarization of the plurality of summarizations, providing the respective summarization to an encoder model to generate a respective candidate vector of the plurality of candidate vectors, where the candidate vectors are in the embedding space as the set of document embeddings.

In some embodiments, the encoder model used to generate the plurality of candidate vectors may be the same as the encoder model used to generate the set of document embeddings. Alternatively, some embodiments may use a different encoder model having different encoder model parameters to generate candidate vectors, where the candidate vectors are in the embedding space as the set of document embeddings. Some embodiments may then select a candidate vector that is furthest from any embedding of the set of document embeddings in an embedding space for additional operations described in this disclosure for text generation. For example, some embodiments may determine that a first vector of a set of generated vectors representing different summarizations is part of a cluster of document embeddings but is furthest from any embedding of the cluster of document embeddings. Some embodiments may then use the summarization associated with the first vector (e.g., the summarization that was used, as an input for an encoder model, to generate the first vector) for text generation operations described elsewhere in this disclosure (e.g., for document generation operations described for block 350).

Some embodiments may select a set of associated documents based on the candidate vector and other vectors in the document embedding space, as indicated by block 344. Some embodiments may determine distances in a document embedding space between the candidate vector and other vectors in the document embedding space. Some embodiments may use these distances to select other embeddings in the document embedding space that are close to the candidate vector. Alternatively, or additionally, some embodiments may use these distances to determine one or more clusters of embeddings into which the candidate vector should fit. For example, some embodiments may select a subset of embeddings in an embedding space based on a determination that each embedding of the subset of embeddings is within a document embedding distance threshold of the candidate vector. A document embedding distance threshold may be pre-defined for an embedding space via a configuration file or other set pre-determined configuration parameters for an embedding space. Alternatively, or additionally, some embodiments may determine a document embedding distance threshold based on the distribution of distances between embeddings in an embedding space. For example, some embodiments may determine a document embedding distance threshold by first performing a set of clustering operations to determine a set of clusters and then defining the document embedding distance threshold to be equal to or otherwise correlated with an average distance (e.g., a mean average, a median average, a mode average) between different embeddings in the cluster or between a centroid of the cluster and other embeddings of the cluster.

When determining a cluster of documents, some embodiments may use density-based clustering to determine clusters and densities and then select the set of embeddings to be used based on a detected association between a candidate vector and a candidate cluster. For example, some embodiments may obtain a density-related distance threshold based on a set of pre-configured values obtained via a user interface, a configuration file, etc. Some embodiments may then determine distances between embedding vectors, determine a density value based on the determined distances, and compare the density value to the density-related distance threshold. Based on a determination that the distance between a first and a second embedding is within the density-related distance threshold, that the first embedding is part of a cluster, and that a minimum embedding count threshold for the cluster is satisfied, some embodiments may assign the second embedding to the first cluster. Some embodiments may then iteratively assign additional embeddings of a set of embeddings to different clusters using such operations. After obtaining a candidate vector, some embodiments may determine which cluster is closest to the candidate vector and assign the candidate vector to this closest cluster. Some embodiments may then select one or more embeddings of that cluster indicated to be the nearest neighbors of the candidate vector for use or to use the documents characterized by these selected embeddings for text generation operations, as described elsewhere in this disclosure.

Some embodiments may then use a set of documents associated with the subset of embeddings (e.g., the set of documents provided to an embedding generation model to generate the subset of embeddings) to either select a text generation model, augment a text generation model, or use one or more portions of the set of documents as an additional input for the text generation model.

Some embodiments may generate a new document based on the candidate document and a set of portions of the set of associated documents or model weights generated based on the set of portions of the set of associated documents, as indicated by block 350. Some embodiments may generate a new document based on a candidate document by using text from the candidate document as a first set of seed tokens for text generation operations or by using a detected linguistic pattern as a pattern template for generated text. Alternatively, or additionally, some embodiments may perform document generation by selecting additional tokens from additional documents for use as a second set of seed tokens or to determine one or more linguistic patterns as a pattern template for generated text. Some embodiments may provide a first set of seed tokens from a candidate document and a second set of seed tokens from an associated document to a text generation model. For example, after being provided with a candidate document, some embodiments may determine a candidate vector based on the candidate document, determine a set of associated documents based on the candidate vector's distances to other document embeddings in an embedding space, and select the set of associated documents based on indicated associations between the selected set of associated documents and these other document embeddings. Some embodiments may then select both segments from the candidate document and segments of the associated documents for text generation operations (e.g., using seed tokens selected from the segments of associated documents). Furthermore, when selecting segments of associated documents for use as inputs, some embodiments may take advantage of indicated sections and select only segments assigned to a specific section. For example, when selecting text for use as seed tokens, some embodiments may restrict the selection to segments that are labeled with the section indicator "supporter."

In some embodiments, a utilized text generation model may be one of multiple text generation models, where each text generation model of the multiple text generation models may be trained for a specific domain, embedding cluster, etc. Some embodiments may select one or more text generation models to use based on distances between a candidate vector generated with a candidate document and other embeddings in an embedding space or other relationships between the candidate vector and other embeddings in the embedding space. For example, some embodiments may select a first text generation model for use based on a determination that a candidate vector is within a first cluster. The first text generation model may have been selected in lieu of other models selectable from a plurality of available text generation models. In some embodiments, the first text generation model is trained based on documents represented by embeddings within the first cluster. Some embodiments may determine that the candidate vector should be a part of the first cluster based on a determination that the candidate vector is within a hull formed from the embeddings of the first cluster. Alternatively, or additionally, some embodiments may determine that the candidate vector should be part of the first cluster based on a determination that the nearest neighbor to the candidate vector is an embedding of the first cluster.

Some embodiments may train a subset of a machine learning model to update a subset of model parameters without updating the entirety of a machine learning model used for text generation operations, where a model parameter may include a weight, bias, memory parameter, or other parameter of a neural unit of a neural network. For example, some embodiments may train a first subset of text generation model layers formed from multiple neural units while using a previously trained or previously obtained second subset of text generation model layers. Some embodiments may then use the previously obtained or trained second subset of text generation model layers in conjunction with the first subset of text generation model layers. In some embodiments, the first subset of text generation model layers may be trained based on a selected set of documents that are mapped to a first cluster of embeddings in an embedding space. Some embodiments may then select the first subset of text generation model layers after obtaining a candidate document based on a determination that the nearest cluster to a candidate vector generated based on the candidate document is the first cluster.

Some embodiments can delete a portion of a candidate document before generating a vector based on the candidate document. For example, after obtaining a candidate document for use as an input for a text generation model, some embodiments may generate a modified input text from the candidate document before providing the modified input text to a text generation model. Some embodiments may generate the modified input text by deleting or otherwise not including at least one portion of the candidate document in the modified input text. For example, some embodiments may separate a candidate document into a set of candidate document segments and assign "keep" or "discard" indicators to each respective segment based on whether the respective segment is in a target section, whether an embedding generated from the respective segment is within a distance threshold of a target segment embedding (e.g., a target segment embedding associated with a document embedding indicated as a neighbor of the candidate document embedding), whether the respective segment includes a set of target tokens, etc. Some embodiments may generate a modified input text from the candidate document, where the modified input text includes a first subset of segments that includes segments labeled "keep" and excludes a second subset of segments that includes segments labeled "discard."

As described elsewhere, some embodiments may perform operations to predict future vectors for an embedding space based on a set of embeddings in the embedding space. After predicting a future vector or future region, some embodiments may perform operations related to the predicted future region for text generation operations. For example, some embodiments may determine that a first candidate vector is not within a future region. In response, some embodiments may perform operations to generate a second candidate vector that is closer to the predicted future vector, is closer to the predicted future region, or is within the predicted future region by modifying one or more values of the first candidate vector. Some embodiments may modify a value by obtaining a pre-determined perturbation limit and adding, subtracting, multiplying, or otherwise changing the value based on the perturbation limit. Some embodiments may then use the second candidate vector to generate a new document using operations described in this disclosure.

Some embodiments may perform operations to enforce a desired level of similarity between generated documents and stored documents. After generating a new structured document, some embodiments may generate a new vector by providing the new structured document to an encoder model. Some embodiments may then determine whether a distance between the new document embedding and the first document embedding satisfies a similarity threshold (e.g., is less than a similarity threshold). For example, some embodiments may compare the new vector representing the new structured document with the embeddings of an embedding space and determine that at least one embedding of the embedding space is too close to the new vector. Some embodiments may determine that the new vector and the nearest embedding are too close based on a determination that a distance between the new vector and the nearest embedding is less than a maximum distance representing a similarity threshold.

Based on this result, some embodiments may generate a new set of seed tokens by selecting the seed tokens from a new document that is associated with a different neighboring embedding in the embedding space. For example, a first embedding of a first document may be the nearest embedding to a candidate vector of a candidate document, and a second embedding may be the second-nearest embedding of a second document to the candidate vector. Some embodiments may generate a first new document by providing a text generation model with first seed tokens from the candidate document and second seed tokens from the first document.

Some embodiments may then determine that the first new document is too similar to the nearest embedding and, in response, select a third set of seed tokens from the second document. Some embodiments may then generate a second new document by providing the first set of seed tokens, the second set of seed tokens, and the third set of seed tokens to the text generation model. Alternatively, or additionally, some embodiments may generate another new document by providing the text generation model with the first set of seed tokens and the third set of seed tokens without providing the text generation model with the second set of seed tokens.

Some embodiments may project one or more results into a two-dimensional or three-dimensional graph to show embedding spaces, trajectories of embeddings in the embedding spaces, predicted future vectors, predicted future regions, or other information described in this disclosure. For example, some embodiments may assign different colors to different points or regions in an embedding space that is to be represented in a three-dimensional dataset based on labels assigned to the different points or regions. Some embodiments may generate visualization data indicating an embedding space with the different shapes, colors, fonts, text, or other data and provide the visualization data to a client computing device for display. Some embodiments may perform dimensional reduction for embedding space data by reducing the higher-dimensional vector set of the embedding space data into a lower-dimensional vector set. For example, some embodiments may reduce an embedding space from ten dimensions into a lower-dimensional vector set (e.g., a three-dimensional dataset) by using a dimension-reducing method, such as principal component analysis (PCA), feature selection operations, or other dimension-reducing methods. Some embodiments may then send the three-dimensional dataset and indicators of shapes, colors, or text used to represent the three-dimensional dataset to a display device so that the three-dimensional dataset may be displayed on the display device. In some embodiments, embeddings or lower-dimensional versions of the embeddings may be represented by a same color based on one or more document metadata values.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIGS. 1-2 could be used to perform one or more of the operations described in relation to FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: generating a set of document embeddings within an embedding space based on a set of structured documents by, for a first document of the set of structured documents: determining (i) a first vector based on a first segment of the first document and (ii) a second vector based on a second segment of the first document; updating a set of association vectors indicating the second segment based on a first distance between the first vector and the second vector; and generating a first document embedding of the set of document embeddings in the embedding space based on the set of association vectors; generating a candidate vector based on a candidate document; determining a result indicating that a second distance between the candidate vector and the first document embedding of the set of document embeddings satisfies a document embedding distance threshold; and based on the result, generating a new document by providing, to a text generation model, a portion of the candidate document and a portion of the second segment of the first document.

2. The method of embodiment 1, wherein the first document embedding is associated with the first document.

3. A method comprising: generating document embeddings within an embedding space based on a corpora of structured documents by, for each respective document of the structured documents: providing (i) a leader segment of the respective document to a first set of encoder network layers to determine a leader vector and (ii) a supporter segment of the respective document to the first set of encoder network layers to determine a supporter vector; updating a set of association vectors indicating the supporter segment based on a first distance between the first and second vectors; and generating a first embedding of the document embeddings in the embedding space by providing the set of association vectors to a second set of encoder network layers; generating a candidate vector based on a candidate document; determining whether a second distance between the candidate vector and a first document embedding of the document embeddings satisfies a document embedding distance threshold, wherein the first document embedding is associated with a first document; and in response to a determination that the second distance satisfies the document embedding distance threshold, generating a new document by providing, to a text generation model, the candidate document and portions of the supporter segment of the first document indicated by the set of association vectors associated with the first document.

4. A method comprising: generating document embeddings within an embedding space based on a set of structured documents by, for a first document of the set of structured documents: determining (i) a first vector based on a first segment of the first document and (ii) a second vector based on a second segment of the first document; updating a set of association vectors indicating the supporter segment based on a first distance between the leader vector and the supporter vector; and generating a first embedding of the document embeddings in the embedding space based on the set of association vectors; generating a candidate vector based on a candidate document; determining a result indicating that a second distance between the candidate vector and a first document embedding of the document embeddings satisfies a document embedding distance threshold, wherein the first document embedding is associated with the first document; and in response to the result, generating a new document by providing, to a text generation model, a portion of the candidate document and a portion of the second segment of the first document.

5. The method of any of embodiments 1 to 4, wherein the result is a first result, and wherein generating the new document comprises: obtaining a density-related distance threshold; determining distances between embeddings in the embedding space; determining a set of embedding clusters based on the distances; determining a second result indicating that the candidate vector is within a first cluster; selecting the first cluster in response to the second result; and determining a third result indicating that the first cluster is associated with a density value within the density-related distance threshold, wherein generating the new document comprises generating the new document based on the third result.

6. The method of any of embodiments 1 to 5, wherein generating the candidate vector comprises: generating modified input text that comprises a first portion of the candidate document without comprising a second portion of the candidate document; and providing the modified input text to an encoder to generate the candidate vector.

7. The method of any of embodiments 1 to 6, further comprising: providing a first token of the candidate document to a knowledge graph to retrieve an alternative token; and generating a modified version of the candidate document by replacing the first token with the alternative token, wherein generating the candidate vector comprises generating the candidate vector based on the modified version of the candidate document.

8. The method of any of embodiments 1 to 7, wherein the candidate vector is a first candidate vector, and wherein the result is a first result, and wherein generating the first candidate vector comprises: generating a plurality of summarizations using a text summarization model based on the candidate document; generating a plurality of candidate vectors by, for each respective summarization of the plurality of summarizations, providing the respective summarization to an encoder to generate a respective candidate vector of the plurality of candidate vectors, wherein the plurality of candidate vectors comprises the first candidate vector; and selecting the first candidate vector based on a second result indicating that the first candidate vector is furthest from any embedding of the document embeddings.

9. The method of any of embodiments 1 to 8, further comprising generating a plurality of phrases based on the second segment by substituting initial tokens of the second segment with additional tokens mapped to the initial tokens, wherein generating the first document embedding comprises: generating a plurality of intermediate embeddings by providing a first set of encoder layers with the plurality of phrases; and generating a plurality of document embeddings by providing a second set of encoder layers with the plurality of intermediate embeddings, wherein the plurality of document embeddings comprises the first document embedding.

10. The method of any of embodiments 1 to 9, further comprising: obtaining dates associated with the set of structured documents, wherein each date of the dates is mapped to a document of the set of structured documents; generating a trajectory associated with a label for a subset of embeddings of the document embeddings based on a subset of the dates, wherein each embedding of the subset of embeddings is categorized with the label; predicting a future region in the embedding space based on the trajectory; and storing, in a data store, the future region in association with the label.

11. The method of embodiment 10, wherein the result is a first result, and wherein generating the candidate vector comprises: determining a second result indicating that the candidate vector is not within the future region; and in response to the second result indicating that the candidate vector is not within the future region, modifying a value of the candidate vector to be within the future region in the embedding space.

12. The method of any of embodiments 1 to 11, further comprising: dimensionally reducing the document embeddings to a three-dimensional dataset; and generating a visualization based on the three-dimensional dataset.

13. The method of any of embodiments 1 to 12, the operations further comprising: obtaining a list of tokens or token sequences; and segmenting the first document, wherein segmenting the first document comprises determining the first segment based on a set of detected matches between tokens of the first document and at least one element of the list of tokens or token sequences.

14. The method of any of embodiments 1 to 13, wherein the result is a first result, the operations further comprising: determining a second result indicating that text spacing surrounding at least a portion of the second segment satisfies a text spacing threshold; and segmenting the first document into the second segment based on the second result.

15. The method of any of embodiments 1 to 14, wherein the text generation model is a first text generation model, the operations further comprising selecting the first text generation model of a plurality of available generative models based on the result.

16. The method of any of embodiments 1 to 15, further comprising: selecting a first subset of the set of document embeddings based on a shared label assigned to each embedding of the first subset; dimensionally reducing the first subset to a lower-dimensional vector set; and generating a visualization of the lower-dimensional vector set, wherein each vector of the lower-dimensional vector set is shown with a same color.

17. The method of any of embodiments 1 to 16, wherein: the portion of the candidate document comprises a first set of seed tokens of the first document; the portion of the second segment comprises a second set of seed tokens of the second segment; and generating the new document comprises providing the first set of seed tokens and the second set of seed tokens to the text generation model.

18. The method of any of embodiments 1 to 17, further comprising: generating a new document embedding based on the new document; and determining whether a third distance between the new document embedding and the first document embedding is less than a similarity threshold; in response to a determination that the third distance is less than the similarity threshold, determining a third set of seed tokens based on a second document associated with a second embedding of the embedding space; and generating a second new document based on the third set of seed tokens.

19. The method of any of embodiments 1 to 18, further comprising obtaining first document metadata with the first document, wherein: the first document metadata comprises at least one of a date, a country identifier, or a document creator identifier; and generating the first document embedding comprises generating the first document embedding based on the first document metadata.

20. The method of any of embodiments 1 to 19, further comprising: determining image text by providing an object recognition model with an image associated with the first document; and determining, based on the image text, that the image is associated with at least one of the first segment or the second segment, wherein generating the first document embedding comprises generating the first document embedding based on the association between the image and the first segment or the second segment.

21. The method of any of embodiments 1 to 20, the operations further comprising: segmenting the first document into a first super-segment comprising the first segment and a second super-segment comprising the second segment and a third segment; determining a third vector based on the third segment; determining that a distance between the second and third vectors satisfies a similarity threshold and, in response update an element of the set of association vectors to indicate the third segment.

22. One or more tangible, non-transitory, machine-readable media storing instructions that, when executed by a set of processors, cause the set of processors to effectuate operations comprising those of any of embodiments 1 to 21.

23. A system comprising: a set of processors and a set of media storing computer program instructions that, when executed by the set of processors, cause the set of processors to effectuate operations comprising those of any of embodiments 1 to 21.

What is claimed is:

1. A system for generating a document by forming document embeddings indicating relationships between different segments of structured documents, the system comprising one or more non-transitory, machine-readable media storing program instructions that, when executed by one or more processors, cause the one or more processors to perform operations comprising:

generating document embeddings within an embedding space based on a corpora of structured documents by, for each respective document of the structured documents:

providing (i) a leader segment of the respective document to a first set of encoder network layers to determine a leader vector and (ii) a supporter segment of the respective document to the first set of encoder network layers to determine a supporter vector;

updating a set of association vectors indicating the supporter segment based on a first distance between the leader vector and the supporter vector; and generating a respective embedding of the document embeddings in the embedding space by providing the set of association vectors to a second set of encoder network layers;

generating a candidate vector based on a candidate document;

determining whether a second distance between the candidate vector and a first document embedding of the document embeddings satisfies a document embedding distance threshold, wherein the first document embedding is associated with a first document; and in response to a determination that the second distance satisfies the document embedding distance threshold, generating a new document by providing, to a text generation model, the candidate document and portions of the supporter segment of the first document indicated by the set of association vectors associated with the first document.

2. A method, the method comprising:

generating document embeddings within an embedding space based on a set of structured documents by, for a first document of the set of structured documents:

determining (i) a first vector based on a first segment of the first document and (ii) a second vector based on a second segment of the first document;

updating a set of association vectors indicating the second segment based on a first distance between the first vector and the second vector; and generating a first document embedding of the document embeddings in the embedding space based on the set of association vectors;

generating a candidate vector based on a candidate document;

determining a result indicating that a second distance between the candidate vector and the first document embedding satisfies a document embedding distance threshold, wherein the first document embedding is associated with the first document; and in response to the result, generating a new document by providing, to a text generation model, a portion of the candidate document and a portion of the second segment of the first document.

3. The method of claim 2, wherein the result is a first result, and wherein generating the new document comprises:

obtaining a density-related distance threshold;

determining distances between embeddings in the embedding space;

determining a set of embedding clusters based on the distances;

determining a second result indicating that the candidate vector is within a first cluster;

selecting the first cluster in response to the second result; and determining a third result indicating that the first cluster is associated with a density value within the density-related distance threshold, wherein generating the new document comprises generating the new document based on the third result.

4. The method of claim 2, wherein generating the candidate vector comprises:

generating modified input text that comprises a first portion of the candidate document without comprising a second portion of the candidate document; and providing the modified input text to an encoder to generate the candidate vector.

5. The method of claim 2, further comprising:

providing a first token of the candidate document to a knowledge graph to retrieve an alternative token; and generating a modified version of the candidate document by replacing the first token with the alternative token, wherein generating the candidate vector comprises generating the candidate vector based on the modified version of the candidate document.

6. The method of claim 2, wherein the candidate vector is a first candidate vector, and wherein the result is a first result, and wherein generating the first candidate vector comprises:

generating a plurality of summarizations using a text summarization model based on the candidate document;

generating a plurality of candidate vectors by, for each respective summarization of the plurality of summarizations, providing the respective summarization to an encoder to generate a respective candidate vector of the plurality of candidate vectors, wherein the plurality of candidate vectors comprises the first candidate vector; and selecting the first candidate vector based on a second result indicating that the first candidate vector is furthest from any embedding of the document embeddings.

7. The method of claim 2, further comprising generating a plurality of phrases based on the second segment by substituting initial tokens of the second segment with additional tokens mapped to the initial tokens, wherein generating the first document embedding comprises:

generating a plurality of intermediate embeddings by providing a first set of encoder layers with the plurality of phrases; and generating a plurality of document embeddings by providing a second set of encoder layers with the plurality of intermediate embeddings, wherein the plurality of document embeddings comprises the first document embedding.

8. The method of claim 2, further comprising:

obtaining dates associated with the set of structured documents, wherein each date of the dates is mapped to a document of the set of structured documents;

generating a trajectory associated with a label for a subset of embeddings of the document embeddings based on a subset of the dates, wherein each embedding of the subset of embeddings is categorized with the label;

predicting a future region in the embedding space based on the trajectory; and storing, in a data store, the future region in association with the label.

9. The method of claim 8, wherein the result is a first result, and wherein generating the candidate vector comprises:

determining a second result indicating that the candidate vector is not within the future region; and in response to the second result indicating that the candidate vector is not within the future region, modifying a value of the candidate vector to be within the future region in the embedding space.

10. The method of claim 2, further comprising:

dimensionally reducing the document embeddings to a three-dimensional dataset; and generating a visualization based on the three-dimensional dataset.

11. One or more non-transitory, machine-readable media storing program instructions that, when executed by one or more processors, perform operations comprising:

generating a set of document embeddings within an embedding space based on a set of structured documents by, for a first document of the set of structured documents:

determining (i) a first vector based on a first segment of the first document and (ii) a second vector based on a second segment of the first document;

updating a set of association vectors indicating the second segment based on a first distance between the first vector and the second vector; and generating a first document embedding of the set of document embeddings in the embedding space based on the set of association vectors, wherein the first document embedding is associated with the first document;

generating a candidate vector based on a candidate document;

determining a result indicating that a second distance between the candidate vector and the first document embedding of the set of document embeddings satisfies a document embedding distance threshold; and based on the result, generating a new document by providing, to a text generation model, a portion of the candidate document and a portion of the second segment of the first document.

12. The one or more machine-readable media of claim 11, the operations further comprising:

obtaining a list of tokens or token sequences; and segmenting the first document, wherein segmenting the first document comprises determining the first segment based on a set of detected matches between tokens of the first document and at least one element of the list of tokens or token sequences.

13. The one or more machine-readable media of claim 11, wherein the result is a first result, the operations further comprising:

determining a second result indicating that text spacing surrounding at least a portion of the second segment satisfies a text spacing threshold; and segmenting the first document into the second segment based on the second result.

14. The one or more machine-readable media of claim 11, wherein the text generation model is a first text generation model, the operations further comprising selecting the first text generation model of a plurality of available generative models based on the result.

15. The one or more machine-readable media of claim 11, the operations further comprising:

selecting a first subset of the set of document embeddings based on a shared label assigned to each embedding of the first subset;

dimensionally reducing the first subset to a lower-dimensional vector set; and generating a visualization of the lower-dimensional vector set, wherein each vector of the lower-dimensional vector set is shown with a same color.

16. The one or more machine-readable media of claim 11, wherein:

the portion of the candidate document comprises a first set of seed tokens of the first document;

the portion of the second segment comprises a second set of seed tokens of the second segment; and generating the new document comprises providing the first set of seed tokens and the second set of seed tokens to the text generation model.

17. The one or more machine-readable media of claim 11, the operations further comprising:

generating a new document embedding based on the new document;

determining whether a third distance between the new document embedding and the first document embedding is less than a similarity threshold;

in response to a determination that the third distance is less than the similarity threshold, determining a third set of seed tokens based on a second document associated with a second embedding of the embedding space; and generating a second new document based on the third set of seed tokens.

18. The one or more machine-readable media of claim 11, the operations further comprising obtaining first document metadata with the first document, wherein:

the first document metadata comprises at least one of a date, a country identifier, or a document creator identifier; and generating the first document embedding comprises generating the first document embedding based on the first document metadata.

19. The one or more machine-readable media of claim 11, the operations further comprising:

determining image text by providing an object recognition model with an image associated with the first document; and determining, based on the image text, that the image is associated with at least one of the first segment or the second segment, wherein generating the first document embedding comprises generating the first document embedding based on the association between the image and the first segment or the second segment.

20. The one or more machine-readable media of claim 11, the operations further comprising:

segmenting the first document into a first section comprising the first segment and a second section comprising the second segment and a third segment;

determining a third vector based on the third segment; and determining that a distance between the second and third vectors satisfies a similarity threshold and, in response, updating an element of the set of association vectors to indicate the third segment.

* * * * *